(12) United States Patent
Bruurs (10) Patent No.: US 8,122,797 B2
(45) Date of Patent: Feb. 28, 2012

(54) TOOL INCORPORATING A LOCKING SWING BOLT CONSTRUCTION WITH ASSOCIATED METHOD

(75) Inventor: Antonius Johannes Henricus Bruurs, Reusel (NL)

(73) Assignee: N.V. Holmatro, Raamsdonksveer (NL)

( * ) Notice: Subject to any disclaimer, the term of this patent is extended or adjusted under 35 U.S.C. 154(b) by 964 days.

(21) Appl. No.: 11/884,232

(22) PCT Filed: Feb. 20, 2006

(86) PCT No.: PCT/NL2006/000087
§ 371 (c)(1),
(2), (4) Date: May 9, 2008

(87) PCT Pub. No.: WO2006/088363
PCT Pub. Date: Aug. 24, 2006

(65) Prior Publication Data
US 2008/0289465 A1    Nov. 27, 2008

(30) Foreign Application Priority Data
Feb. 18, 2005   (NL) ..................................... 1028334

(51) Int. Cl.
*B26D 1/00* (2006.01)
*B26B 15/00* (2006.01)
(52) U.S. Cl. .................. 83/13; 30/223; 30/231; 30/244; 30/254

(58) Field of Classification Search .................... 30/134, 30/228, 223, 224, 227, 231, 234, 239, 244, 30/245, 251, 252, 254; D8/61; 403/348, 403/350; 83/13
See application file for complete search history.

(56) References Cited

U.S. PATENT DOCUMENTS

| | | | | |
|---|---|---|---|---|
| 3,893,237 A * | 7/1975 | Jahnke | ........................... | 30/228 |
| 4,198,747 A * | 4/1980 | LaBounty | ...................... | 30/134 |
| 4,506,445 A * | 3/1985 | Esten | .............................. | 30/228 |
| 4,616,417 A * | 10/1986 | Gross | .............................. | 30/134 |
| 4,682,416 A * | 7/1987 | Stolfa | ............................. | 30/228 |
| 5,088,198 A * | 2/1992 | Drusiani | ..................... | 30/123.3 |

(Continued)

FOREIGN PATENT DOCUMENTS

FR    2580215 A1 * 10/1986

(Continued)

OTHER PUBLICATIONS

International Preliminary Examination Report dated Aug. 30, 2007.

*Primary Examiner* — Jason Daniel Prone
(74) *Attorney, Agent, or Firm* — Harness, Dickey & Pierce, P.L.C.

(57) ABSTRACT

The invention relates to a tool for clamping together pivotable parts under bias relative to each other, using a swing bolt construction for mounting the pivotable parts on a fork of a holder. Such a swing bolt construction has a swing bolt with a widened part provided on a first outer end and provided on the other outer end with first fastener, such as a thread. Further the swing bolt construction has a nut provided with a second fastener, such as a thread, for fastening the nut to the first fastener on the other end of the swing bolt. The widened part of the swing bolt and the nut lie in use—i.e. in assembled state—against the pivotable parts for clamping thereof under the required bias.

21 Claims, 4 Drawing Sheets

U.S. PATENT DOCUMENTS

| | | | | |
|---|---|---|---|---|
| 5,172,479 A | * | 12/1992 | Keeton | 30/228 |
| 5,187,868 A | * | 2/1993 | Hall | 30/134 |
| 5,384,962 A | * | 1/1995 | Pemberton | 30/134 |
| D355,575 S | * | 2/1995 | Broucksou | D8/61 |
| D361,027 S | * | 8/1995 | Striffler | D8/61 |
| 5,454,754 A | * | 10/1995 | Baertlein | 30/228 |
| 5,474,242 A | * | 12/1995 | Rafn | 30/134 |
| RE35,432 E | * | 1/1997 | LaBounty et al. | 30/134 |
| 5,704,560 A | * | 1/1998 | Wimmer | 30/134 |
| 5,894,666 A | * | 4/1999 | Hrusch | 30/134 |
| 5,901,447 A | * | 5/1999 | Dunning | 30/228 |
| 5,918,370 A | * | 7/1999 | Wells | 30/228 |
| 6,092,290 A | * | 7/2000 | Vogelsanger | 30/228 |
| 6,202,308 B1 | * | 3/2001 | Ramun | 30/134 |
| 6,298,560 B1 | * | 10/2001 | Lee | 30/134 |
| 6,766,973 B2 | * | 7/2004 | Muri | 30/134 |
| 7,093,365 B2 | * | 8/2006 | Peterson | 30/210 |
| 7,100,373 B2 | * | 9/2006 | Oide | 30/228 |
| 7,121,489 B2 | * | 10/2006 | Ramun | 30/134 |
| 7,255,295 B2 | * | 8/2007 | Ramun | 30/228 |
| 7,284,720 B2 | * | 10/2007 | Ramun | 30/228 |
| 2004/0055164 A1 | * | 3/2004 | Molins | 30/228 |
| 2005/0028391 A1 | | 2/2005 | Peterson | |
| 2005/0262700 A1 | * | 12/2005 | Alseth et al. | 30/134 |
| 2006/0053633 A1 | * | 3/2006 | Gurri Molins | 30/228 |
| 2009/0090009 A1 | * | 4/2009 | Wilkins et al. | 30/134 |
| 2009/0271991 A1 | * | 11/2009 | Clark et al. | 30/228 |

FOREIGN PATENT DOCUMENTS

WO    WO 2006088363 A2 *    8/2006

* cited by examiner

TOOL INCORPORATING A LOCKING SWING BOLT CONSTRUCTION WITH ASSOCIATED METHOD

CROSS-REFERENCE TO RELATED APPLICATIONS

This application is a National Stage of International Application No. PCT/NL2006/000087 filed on Aug. 13, 2007. This application also claims the benefit of Netherlands Patent Application No. 1028334 filed on Feb. 18, 2005. The disclosures of each of the above applications are incorporated herein by reference in their entirety.

FIELD

The present invention relates to a tool for clamping together pivotable parts under bias relative to each other. The invention also relates to a swing bolt construction with integrated locking, as for instance applied in said tool.

BACKGROUND

Hydraulic shears are an example of such a tool. This is understood to mean, among others, shears with a sufficient cutting force for cutting open objects such as motor vehicles, trains, boats and the like, for instance in the case of vehicle accidents, search and rescue operations in an urban environment, industrial applications and rail accidents. In the case of hydraulic shears the pivotable parts (also referred to as blades) of the shears are displaced by means of an externally or internally driven hydraulic cylinder, and a very great cutting force can hereby be exerted on the relevant object. Another example of such a tool is a hydraulic spreader with which parts of an object can be pressed apart. Another example of such a tool is a combined shears and spreader.

SUMMARY

A swing bolt construction is applied in all these tools to allow said mutually pivotable parts to rotate round a central pivot point, while the moving parts are simultaneously clamped to each other to hold them under a determined bias. The bias is important since it largely determines the effectiveness of the tool and the tool life of the components.

A generally applied construction is that in which the moving parts rotate in a fork construction about a swing bolt, which is provided on an outer end with a screw thread onto which a nut is screwed. Pressing-together of the moving parts, and thereby holding the moving parts under bias, is effected in this manner. The fork construction and the pivotable parts are then clamped to each other. This known construction does however have a number of drawbacks.

A quite large protruding part furthermore results on the side of the tool as a result of the height of the nut and the bolt head. As a result of the relatively large protruding part it is difficult to manoeuvre the tool, particularly when only little space is available in or close to the object.

A further drawback is that, depending on the rotation direction of the moving parts (shear blades or spreader arms), a great radial force results on the swing bolt and/or the nut, whereby the nut can screw itself even tighter or even come loose, with the result that the bias increases or is lost. Losing the biasing force in this way can have a very adverse effect on the operation of the tool. A locking is therefore necessary to prevent the swing bolt construction losing the bias. In many cases the bolt head is therefore embodied such that it fits form-fittingly in a special recess, and can therefore no longer co-rotate. In such a construction the nut of the swing bolt must then also be locked against undesired loosening. This is solved for instance by screwing a second nut on top of the first nut, or by the use of so-called locking nuts, locking plates or locking rings.

A drawback of such a force-absorbing locking construction is that it obtains its effect by means of friction and can lose its effect as soon as a great axial force occurs in the pivot construction. Possible deformation results in play, with loss of bias as a result. This type of locking construction is further susceptible to vibrations, and locking rings are for instance less suitable in the case of hardened parts. Another drawback of these usual locking constructions is the fact that the friction necessary for good operation also uses a part of the torque applied to the nut, and a smaller part is therefore effectively left for the actual bias. It is further not possible to monitor objectively what bias remained when a nut is loosened using a special tool. The friction will always have a higher value prior to loosening than the actual applied torque.

A further drawback of the existing locking constructions is that such constructions require a great deal of additional height, which makes working in limited spaces more difficult.

Yet a further drawback of the known tool is the fact that clamping together of the pivotable parts often takes place by also clamping a so-called holder on the pivotable parts, i.e. clamping the fork of the holder of the tool, wherein the pivotable parts, for instance the spreader elements or the shear blades, are mounted rotatably on the fork. The bolt head and the nut therefore exert a force on the holder, which force is transmitted to the pivoting blades. An extreme axial load in the swing bolt, caused inter alia by the shear blades moving apart during cutting of structurally strong objects, results in a disproportionately distributed stress in the material of said holder, with the result that the nut and bolt head of the swing bolt construction are also disproportionately loaded. This can result in breaking of the bolt. In exceptional cases components of the swing bolt construction can even shoot off in the case of possible overload breakage due to the kinetic energy built up in the holder, the swing bolt, the hinge nut and the optional locking plates or locking rings, which can cause danger for the operator of the tool and possible bystanders.

It is an object of the present invention to obviate at least one of the above stated drawbacks of the known tools or the known swing bolt constructions.

It is a further object of the invention to provide a compact and lightweight tool wherein the danger to the user and possible bystanders when the swing bolt construction breaks is reduced.

According to a first aspect of the present invention, there is provided for this purpose a tool for clamping together pivotable parts under bias relative to each other, comprising:
  a holder provided with a fork, wherein each of the outer ends of the fork is provided with an opening;
  two pivotable parts which can be mounted between the ends of the fork and which are provided with openings at the position of their pivot point;
  a swing bolt construction to be arranged in the openings in the fork and the pivotable parts for the purpose of mounting the pivotable parts on the fork of the holder, the swing bolt construction comprising:
  a swing bolt with a widened part provided on a first outer end and provided on the other outer end with first fastening means;
  a nut provided with second fastening means for fastening the nut to the first fastening means on said other end of the swing bolt;

wherein the widened part of the swing bolt and the nut are embodied so as to lie during use against the pivotable parts for clamping thereof under the required bias.

The pivotable parts are hereby optionally clamped together directly without interposing of for instance the fork of the holder. The first advantage hereof is that the present swing bolt construction can be given a very compact form and can hereby also be lighter in weight. Both the swing bolt and the nut of the swing bolt construction remain inside the fork of the holder of the tool, so that there are practically no longer any protruding parts, and handling of the tool in limited spaces is facilitated.

According to a first preferred embodiment, the widened part of the swing bolt and the nut lie during use directly against the sides of the pivotable parts directed toward the fork outer ends. In this preferred embodiment no parts are arranged between the swing bolt and nut on the one hand and the pivotable parts on the other. The swing bolt construction can hereby be given an even more compact and lighter form than in the embodiment in which the swing bolt and nut lie in indirect manner against the pivotable parts.

In a further preferred embodiment a non-cylindrical shape is arranged on the swing bolt, this shape corresponding with a recess in the fork of the holder so that the swing bolt itself cannot rotate. The nut must of course be able to rotate in order to transmit the bias to the pivotable parts. A widened portion is further arranged on both the swing bolt and on the nut, so that the fork of the holder and the pivotable parts are held together while taking some play into account.

According to another preferred embodiment, the widened part of the swing bolt and/or the nut comprises an at least partly conical part for the purpose of forming an oblique contact surface on the pivotable parts. Owing to this conical form of the swing bolt and the nut the contact surfaces between swing bolt/nut on the one hand and the pivotable parts on the other have an inclining progression, and the effective distance between the two effective lines of force can become greater, thereby resulting, with the same force, in a greater holding torque on the pivotable parts.

According to a further preferred embodiment of the invention, the tool comprises locking means for locking the swing bolt construction, wherein the locking means are arranged in the swing bolt construction. This is understood to mean that the locking means protrude less, or even not at all, outside the swing bolt and the nut themselves, as is for instance the case with the use of a second locking nut on the nut as described above. It is hereby possible to prevent the swing bolt construction having overly protruding parts at the position of the locking ring, which would reduce the manageability of the tool in a limited space.

According to a further preferred embodiment, the tool comprises locking means for locking the nut of the swing bolt construction, comprising:
  a protruding part arranged on the outer end of the swing bolt provided with fastening means;
  a first locking ring which can be fastened non-rotatably to the protruding part of the swing bolt, which locking ring is provided with an external toothing;
  a second locking ring which can be fastened non-rotatably to the nut and placed between the nut and the first locking ring, which second locking ring is provided with an internal toothing which can engage on the external toothing of the first locking ring.

By placing the second locking ring in correct manner and by allowing the external toothing thereof to engage on the internal toothing of the first locking ring, the locking can be ensured once the nut has been brought to the correct, predetermined bias.

In a further preferred embodiment the toothings are embodied such that the nut can be locked relative to the swing bolt with relatively small angular displacement steps ($\Delta\alpha$). The displacement steps are preferably made as small as possible, such as an angular displacement step ($\Delta\alpha$) between $1°$ and $5°$, and preferably between $1°$ and $3°$. By embodying the toothings in this manner the nut does not have to be rotated further to ensure a good locking when the swing bolt construction has been brought to the correct bias.

In an even more preferred embodiment the second locking ring is adapted to enable fastening to the nut in a predetermined number of rotation positions. When it is now ensured, making use of play in the locking means, i.e. between the protrusion on the swing bolt, both locking rings and the nut, this play being necessary to enable easy arrangement or removal of the locking rings, that the number of teeth of the first and second locking rings is not equal to a multiple of said number of rotation positions, and furthermore that the value 360/(number of teeth*number of rotation positions) is smaller than said play, it is possible, as a result of the offsetting of the teeth that occurs, to arrange the locking rings in practically any random position of the nut, and therefore at exactly the desired bias for locking the nut to the swing bolt.

In a structurally advantageous embodiment the protruding part of the swing bolt is formed such that it fits in one or more corresponding internal recesses which are provided in the first locking ring for non-rotatable fastening of the first locking ring to the swing bolt.

According to a further preferred embodiment, the nut is provided with a row of recesses into which external projections provided on the second locking ring can engage to enable non-rotatable fastening of the second locking ring to the nut in a number of positions. When the second locking ring comprises at least one protrusion which protrudes from the nut in the assembled position, for instance when said projections are provided on the peripheral surface of the second locking ring, the recesses are provided in the peripheral edge of the nut and the projections protrude outside the nut in the assembled position, the second locking ring can be readily removed by hand. A further advantage is that, as long as the second locking ring is present, it is not possible for a hand-tool, such as for instance a polygonal socket wrench, to be used to loosen the nut. This requires a logical sequence wherein the locking ring is first removed before the nut can be loosened.

According to a further preferred embodiment of the invention, cover elements can be placed over the openings in the outer ends of the fork. The cover elements have the function, among others, of preventing parts of the swing bolt construction possibly shooting away as a result of breakage caused by extreme axial overloading, whereby the chance of injury to the operator and bystanders is greatly reduced. A further function of the cover elements is to protect the swing bolt construction from the outside world so that the chance of moisture or dirt possibly penetrating the swing bolt construction is reduced further.

In a further preferred embodiment the outer ends of the swing bolt are provided with fastening means for fastening the cover elements during use to the respective outer ends of the swing bolt. The cover elements can hereby be locked on the tool.

In a determined preferred embodiment a cover element is for instance provided with an opening, in which can be arranged a fastening screw engaging on the swing bolt and the relevant cover element in the placed position.

According to another aspect of the present invention, there is provided a swing bolt construction with integrated locking, for instance in the tool described herein, wherein the swing bolt construction comprises:
- a swing bolt;
- a protruding part provided on the end surface of an outer end of the swing bolt;
- a nut which can be fastened to said outer end of the swing bolt;
- a first locking ring which can be mounted non-rotatably on the protruding part of the swing bolt, which locking ring is provided with external toothing;
- a second locking ring which can be mounted non-rotatably on the nut and placed between the nut and the first locking ring, wherein the second locking ring is provided with an internal toothing which can engage on the external toothing of the first locking ring.

BRIEF DESCRIPTION OF THE DRAWINGS

Further advantages, features and details of the present invention will be elucidated on the basis of the following description of a preferred embodiment thereof. Reference is made in the description to the accompanying figures, in which.

DETAILED DESCRIPTION OF EXAMPLE EMBODIMENTS

Figure 1:
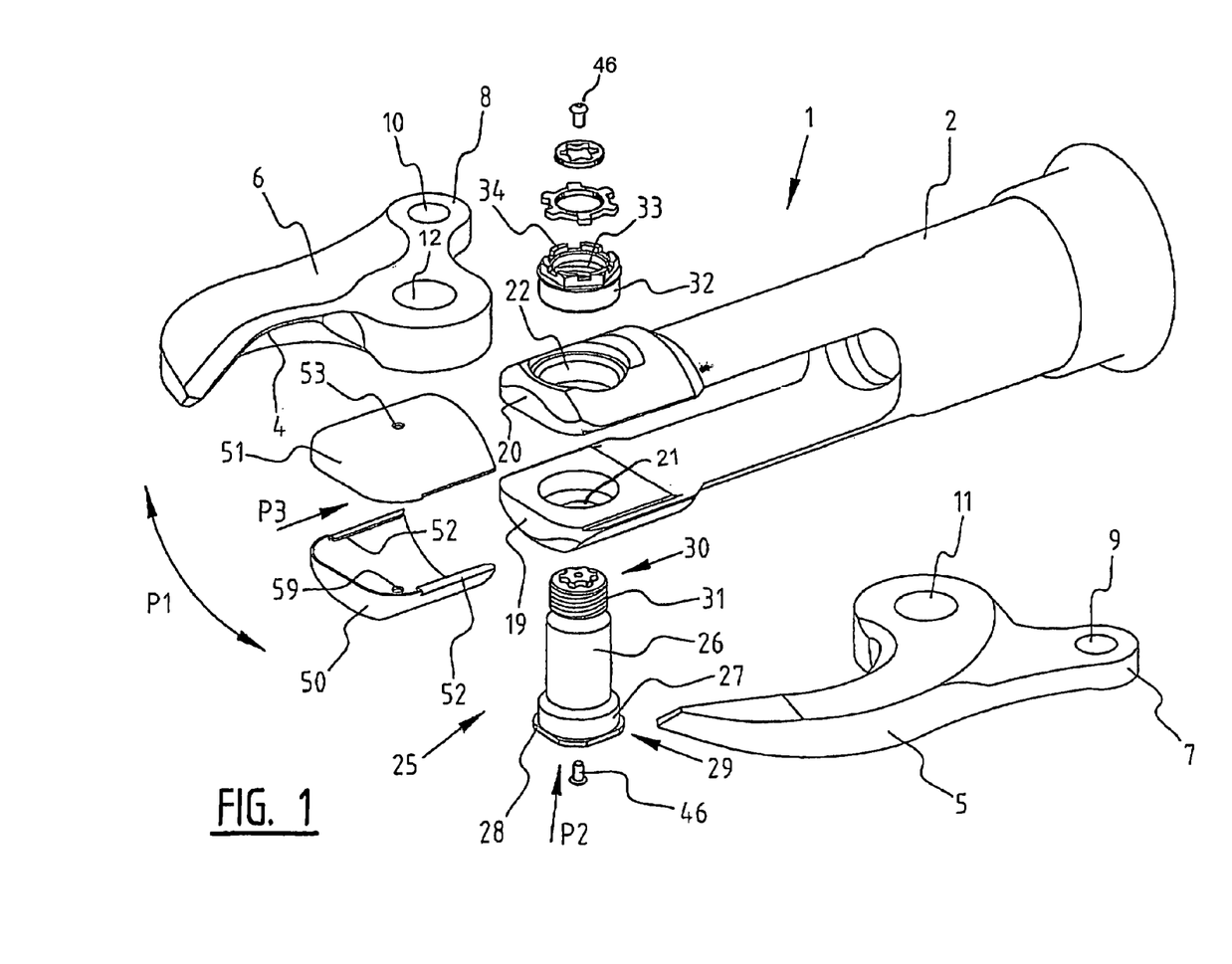
FIG. 1 shows an exploded perspective view of the preferred embodiment of the swing bolt construction in a pair of hydraulic shears.
Figure 2:
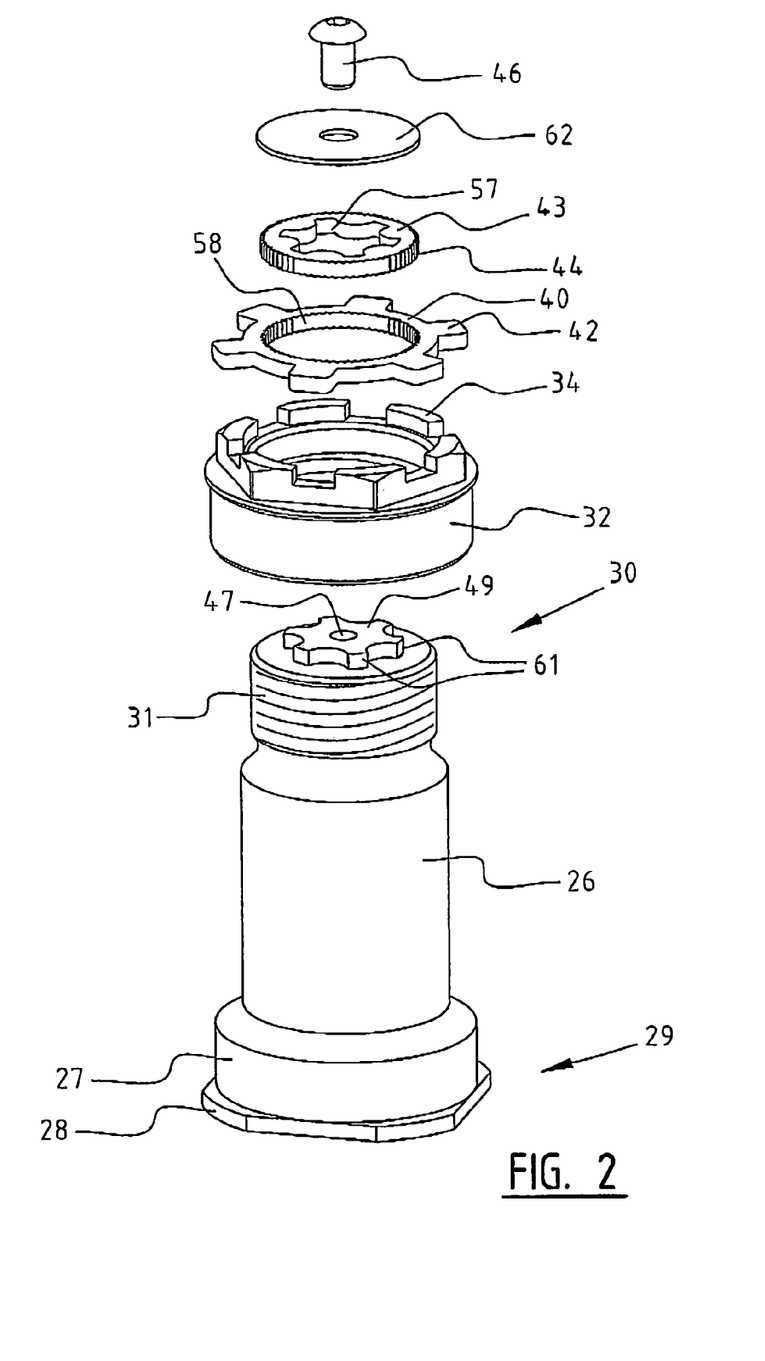
FIG. 2 shows an exploded view of the preferred embodiment of the swing bolt construction.

FIGS. 1 and 2 show an example of a tool in which is arranged a preferred embodiment of the swing bolt construction according to the invention. The embodiment relates to hydraulic shears 1 with which objects such as passenger vehicles, trains, boats and the like can be cut open. Depending on the type of shears 1, the cutting force to be exerted with the shears varies typically (but not limitatively) between 100 and 500 kN. In other embodiments (not shown) the tool is a spreader or a combination of a spreader and shears. In these embodiments the spreading force can vary typically (but not limitatively) between 20 kN and 100 kN.

Shears 1 comprise a housing 2 provided with a holder in which a hydraulic cylinder (not shown) with two pressure rods is arranged in known manner with which shear blades 5, 6 can be operated. Provided on the outer end of the holder is a fork construction, the upper end 20 and lower end 19 of which are shown in the figures, and in particular in FIGS. 1 and 4. The lower and upper ends 19,20 extend on either side of a first shear blade 5 and a second shear blade 6. Shear blades 5,6 are provided with a cutting edge 4 and can pivot relative to each other by means of a swing bolt construction 25 as shown in the figures.

Shear blades 5,6 comprise respective protrusions 7,8 in which openings 9,10 are arranged. Openings 9,10 are provided for mounting therein of the above stated pressure rods (not drawn) of the hydraulic cylinder. Shear blades 5,6 are further provided with openings 12, 11 respectively into which the above stated swing bolt construction 25 can be inserted. Shear blades 5,6 are pivotable relative to swing bolt construction 25 such that blades 5,6 can be opened and closed (direction $P_1$, FIG. 1) by operating the hydraulic cylinders, which are each coupled to protrusions 7,8 by a pressure rod.

Figures 4, 5:
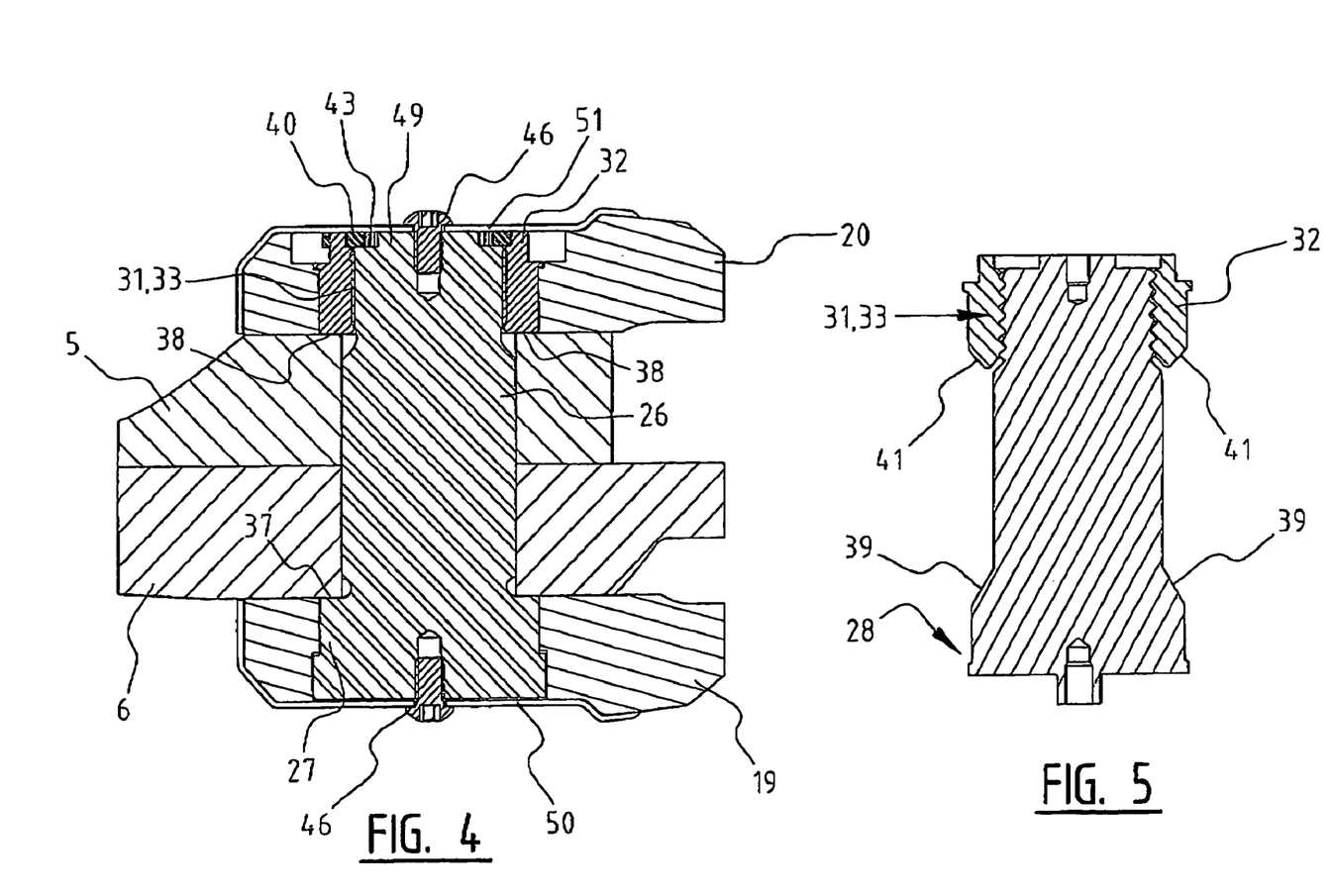
FIG. 4 shows a detail of the preferred embodiment depicted in FIGS. 1-3.
FIG. 5 is a detail showing another preferred embodiment with chamfered contact surfaces of the swing bolt and nut.

FIGS. 2 and 4 show the present preferred embodiment of swing bolt construction 25 in more detail. Swing bolt construction 25 comprises a swing bolt 26 and an associated nut 32. Swing bolt 26 is constructed from an elongate body with a relatively small diameter, wherein a widened element 27, also referred to herein as bolt head, is provided on a first end 29. Provided on the opposite end 30 of swing bolt 26 is external screw thread 31, on which can engage internal screw thread 33 provided on the inner side of nut 32. Along the periphery of outer end 29 the widened element 27 is further provided with a slightly protruding flange 28, while a star-shaped protruding part 49, also referred to as locking element 49, is provided on the opposite end surface of swing bolt 26.

The outer diameter of widened part 27 of swing bolt 26 practically corresponds with the inner diameter of opening 21 in lower part 19 of the holder, so that the widened part 27 can be arranged fitting therein. The protruding flange 28 has a non-cylindrical form, for instance the polygonal form shown in FIG. 1, which corresponds with the form of the opening in outer end 19 of the fork of the holder, such that swing bolt 26 cannot rotate relative to this outer end 19. The outer diameter of nut 32 likewise corresponds to the inner diameter of opening 22, this opening 22 being provided in upper end 20 of the holder. As a result the outer periphery of widened part 27 and the outer periphery of nut 32 will lie against the inner surface of respectively the lower part 19 and upper end 20 of the holder in the assembled situation (as shown in FIG. 4). As stated above, the elongate body part of the swing bolt 26 has a smaller diameter comparable to the diameter of openings 11 and 12 in respective shear blades 5,6. This means that in the assembled situation the outer periphery of the elongate part of the swing bolt 26 lies against the inner side of said openings 11 and 12.

In order to prevent swing bolt 26 shooting through too far when inserted from below ($P_2$), flange 28 of the swing bolt comes to lie on a stop surface (shown in FIG. 4) provided along the edge of opening 21 in lower part 19 of the holder.

After swing bolt 26 has thus been placed through openings 21,11,12,22 the nut 32 is screwed onto the end 30 of swing bolt 25 provided with screw thread 31. Nut 32 is herein tightened with a prescribed torque. A bias suitable for the specific type of shears can thus be exerted on shear blades 5,6. In the tightened situation shear blades 5,6 are now enclosed by respectively the widened part 27 of swing bolt 26 and the nut 32. Because the swing bolt construction 25 according to the invention engages directly on shear blades 5,6, and no other parts (for instance parts of the lower and upper ends 19, 20 of the fork of the holder) are therefore clamped, the torque applied to the nut 32 is optimally converted into the desired bias on the shear blades 5,6.

As can be seen particularly in FIG. 4, in the preferred embodiment the transition part 37 takes a substantially straight form at the position of the transition between widened part 27 and the relatively narrow elongate body of swing bolt 26. However, in another embodiment, such as for instance shown in FIG. 5, transition part 39 has a conical shape. The shape of transition part 39 is here adapted to the transition part extending along opening 12 in shear blade 6.

In similar manner the nut 32 can be provided with a straight transition part 38, as shown in FIG. 4, or with a conical transition part 41 as shown in FIG. 5. The shape of respective transition parts 38, 41 is adapted to the straight or conically extending edge part of opening 11 of the other shear blade 5.

In the embodiment with conical transition parts 39,41 the transition parts 39,41 provide conically tapering contact surfaces between the swing bolt 26 and nut 32 on the one hand and shear blades 5,6 on the other. The bias can now be transmitted at an angle to shear blades 5,6 via the conical contact surface 39 and 41 of bolt head 27 and of nut 32, respectively, which makes it possible to obtain a greater bias.

Figures 3A, 3B, 3C:
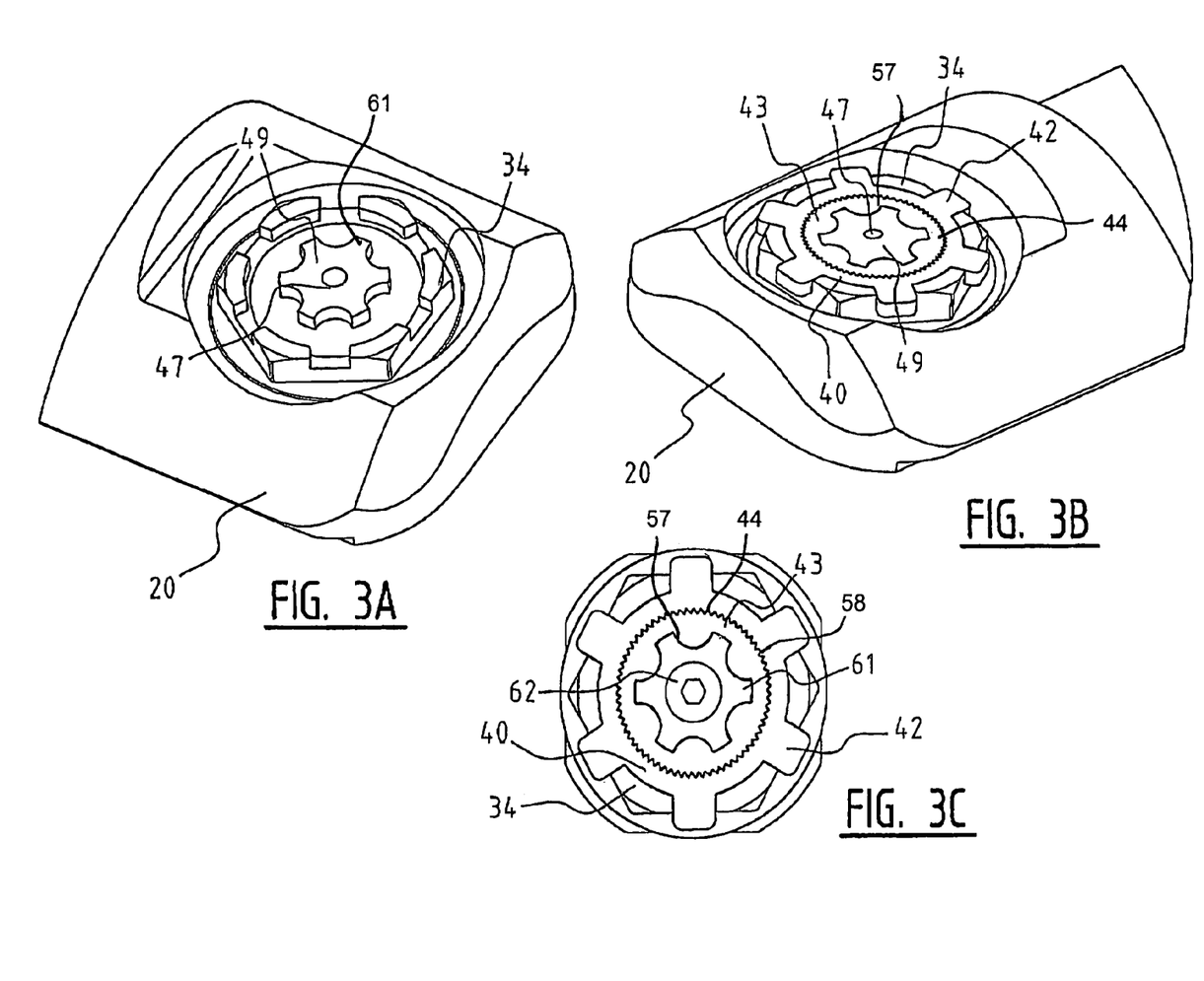
FIGS. 3A and 3B show perspective detail views of the locking of the preferred embodiment of FIG. 1 in respectively unlocked and locked situation.
FIG. 3C is a top view of the locking in the locked situation shown in FIG. 3B.

In order to lock nut 32 on swing bolt 26 the shown embodiment provides a special locking construction. The situation before locking is shown in FIG. 3A, while the locked situation is shown in FIGS. 3B and 3C. As stated above, swing bolt 26 is provided on outer end 30 with a for instance star-shaped locking element 49, embodied with six protrusions 61 (FIGS. 3A, 3C). Nut 32 is likewise provided with a number of projections 34, between which recesses are defined. Once nut 32 has been tightened sufficiently with a torque wrench to ensure the required bias on shear blades 5,6, nut 32 is locked relative to swing bolt 26 in the following manner.

An inner ring 43 provided with an internal fitting form 57 and an external toothing 44 is arranged close-fittingly on star-shaped locking element 49. Then arranged around inner ring 43 is an outer ring 40, the internal toothing 58 of which corresponds with the external toothing 44 of inner ring 43. Outer ring 40 is provided with external projections 42 which fit into the above mentioned recesses between projections 34 on the top side of nut 32.

The locking construction is embodied such that there is a predetermined minimum play between locking element 49 on swing bolt 26, inner locking ring 43, outer locking ring 40 and the mounting in nut 32, i.e. projections 34 and the recesses between the projections 34 on the top side of nut 32.

This play for instance has a value of S degrees, for instance S=1.5 degrees. Both locking rings 40,43 are embodied with toothing 44, 58 whereby the locking rings 40, 43 can be fixed relative to each other. N teeth are used, which teeth divide a complete revolution into X1 (=360/N) degrees. When for instance N=67, X1=5.37 degrees. In respect of the mounting in nut 32, the large outer locking ring 40 can be mounted in X2 positions. In the shown embodiment the large outer locking ring 40 can be mounted in six positions so that X2=6. When the number of teeth of external toothing 44 of small inner locking ring 43 and internal toothing 58 of large outer locking ring 40 are now selected to equal N=k+a multiple of X2, this has the result that, when large outer locking ring 40 is rotated through one position of X2, the toothing 44 effectively shifts through X (=k*X1/X2) degrees. It is the case here that k must be a whole number and that −X2/2<k<+X2/2. In the example where k=1, this corresponds to X=0.89 degrees. When X is not smaller than S, this means that the locking rings 40, 43 fit in practically any random position of nut 32 relative to bolt 26 (X=0.89 degrees smaller than S=1.5 degrees). The nut can hereby always be locked once it has been set to exactly the required torque.

When swing bolt construction 25 has been arranged in the above described manner and nut 32 has been locked relative to swing bolt 26 in the above described manner, two guards 50,51 are then finally arranged on either side of the holder. Guards 50,51 are provided for this purpose with longitudinal edges 52 which can slide laterally along the bottom edge of respectively the lower end 19 and upper end 20 of the fork.

FIG. 1 shows the situation in which guards 50,51 have not yet been mounted. When the guards are displaced in the direction of arrow $P_3$ in the position shown in FIG. 1, they can slide readily over the outer ends of the lower and the upper ends 19,20. In order to ensure that the guards always remain in place during use, they can also be locked. Guards 50,51 are each provided for this purpose with an opening 53, 59 where a locking screw 46 can be arranged, optionally employing the washer ring 62 in FIG. 2. Locking screws 46 can be screwed fixedly into corresponding openings 47 provided in swing bolt head 27 and in the outer end of the swing bolt close to locking element 49. It is however also possible to envisage other ways of locking the guards 50,51 on the holder.

In the embodiment shown in FIGS. 3A, 3B and 3C there is an inner ring 43 and an outer ring 40. In another embodiment (not shown) inner ring 43 is formed integrally with the outer end of the swing bolt 26 instead of the locking element 49. There is only a single locking ring in this embodiment. The manner of locking the nut 32 corresponds with that described above. The above described embodiment with separate inner ring 43 has the advantage that it is quite easy to produce.

The swing bolt construction 25 according to the invention is applied in the manner to be described hereinbelow. After tightening the nut 32 to the desired torque, the inner locking ring 43 can be placed on the locking element 49 of the swing bolt 26. The outer locking ring 40 can then be arranged, this such that the internal toothing of the outer locking ring 40 engages somewhere on the external toothing of the inner locking ring 43, while the external projections 42 of the second locking ring 40 fit simultaneously into the recesses between the projections 34 of the nut 32. The position of the nut 32 must of course not be influenced here. In locking constructions the number of teeth and points of engagement on the nut 32 are chosen at random, whereby it is possible that the second locking ring 40 will not always fit. According to the present invention this is precisely why a toothing is chosen which is always a multiple of the number of recesses between the projections 34 in the nut 32 increased or decreased by a whole number. It is hereby practically always possible to find a position at which the external projections 42 of the outer locking ring 40 will fit into the recesses between the projections 34 of the nut 32 while the toothings of the inner and outer locking rings 43, 40 simultaneously fit into each other. In this manner the nut 32 is locked in wholly form-fitting manner against undesired loosening. The outer locking ring 40 can be removed in simple manner by allowing the external protrusions 42 of the outer locking ring 40 to protrude slightly outside the nut 32. In addition, the outer locking ring 40 must as a result be first removed before a socket wrench can be placed. This requires a logical and safe method.

The invention is not limited to the preferred embodiments of the invention described herein. As already stated above, in addition to the described hydraulic shears the tool described herein for instance also comprises spreaders or combined devices which can both spread and cut. The rights sought are rather defined by the following claims, within the scope of which many modifications can be envisaged.

The invention claimed is:

1. A tool, comprising:
  a holder provided with a fork having outer ends, wherein each of the outer ends of the fork is provided with an opening;
  two pivotable parts, mountable between the outer ends of the fork and provided with openings at a position of the pivot points thereof; and a swing bolt construction arranged in the openings in the fork and through the pivotable parts for mounting the pivotable parts on the fork of the holder, the swing bolt construction comprising:
- a swing bolt with a widened part provided on a first outer end and provided on a second outer end with a first fastening device, and
- a nut provided with a second fastener for fastening the nut to the first fastening device on said second outer end of the swing bolt, wherein the widened part of the swing bolt and the nut are embodied so as to lie during use against the pivotable parts for clamping thereof under required bias.

2. Tool as claimed in claim 1, wherein the tool forms a pair of hydraulic shears, the pivoting parts of which are shear blades.

3. Tool as claimed in claim 1, wherein the widened part of the swing bolt and the nut lie during use directly against sides of the pivotable parts, which sides are directed toward the fork outer ends of the fork.

4. Tool as claimed in claim 1, wherein the first fastening device comprises an external screw thread and a second fastening device comprises an internal screw thread.

5. Tool as claimed in claim 1, wherein at least one of the widened part of the swing bolt and the nut comprises an at least partly straight part forming a straight contact surface with the pivotable parts.

6. Tool as claimed in claim 1, wherein at least one of the widened part of the swing bolt and the nut comprises an at least partly conical part forming an oblique contact surface with the pivotable parts.

7. Tool as claimed in claim 1, wherein the swing bolt comprises a swing bolt head forming the widened part, at least a part of which swing bolt head has a non-cylindrical external shape, where said shape fits non-rotatably in the opening in the outer end of the fork of the holder.

8. Tool as claimed in claim 1, comprising a locking device to lock the swing bolt construction, wherein the locking device is arranged in the swing bolt construction.

9. Tool as claimed in claim 1, comprising a locking device to lock the nut of the swing bolt construction, the locking device comprising:
- a protruding part arranged on the second outer end of the swing bolt provided with a fastening device;
- a first locking ring, non-rotatably fastenable to the protruding part of the swing bolt, the locking ring being provided with an external toothing; and
- a second locking ring non-rotatably fastenable to the nut and placed between the nut and the first locking ring, provided with an internal toothing to engage on the external toothing of the first locking ring.

10. Tool as claimed in claim 9, wherein the internal toothing and the external toothing are embodied to enable locking of the nut relative to the swing bolt in steps with a relatively small angular displacement there between.

11. Tool as claimed in claim 9, wherein the second locking ring is adapted to connect to the nut in a number of rotation positions.

12. Tool as claimed in claim 11, wherein the number (N) of teeth of the first and second locking ring equals k plus a multiple of said number of rotation positions (X2), with being an integer and $-X2/2 < k < +X2/2$.

13. Tool as claimed in claim 12, wherein the number (N) of teeth equals k plus a multiple of X2, wherein k is a whole number and $-X2/2 < k < +X2/2$.

14. Tool as claimed in claim 12, wherein the playa limited degree of freedom (S degrees) in the locking device is greater than or equal to $360/(k*N*X2)$ degrees.

15. Tool as claimed in claim 9, wherein the second locking ring comprises at least one protrusion which protrudes from the nut in an assembled position.

16. Tool as claimed in claim 9, wherein the protruding part is formed such that the protruding part fits into one or more corresponding internal recesses which are provided in the first locking ring for non-rotatable connecting of the first locking ring to the swing bolt.

17. Tool as claimed in claim 9, wherein the nut is provided with a row of recesses into which external projections provided on the second locking ring can engage to enable non-rotatable connecting of the second locking ring to the nut in a predetermined number of positions.

18. Tool as claimed in claim 17, wherein the projections are provided on a peripheral surface of the second locking ring, and the recesses are provided in a peripheral edge of the nut, wherein the projections protrude outside the nut in an assembled position.

19. Tool as claimed in claim 1, wherein cover elements are arranged over the openings in the outer ends of the fork.

20. Tool as claimed in claim 19, wherein the outer ends of the swing bolt are provided with a fastening device to fasten the cover elements during use to the respective outer ends of the swing bolt.

21. A method, comprising:
using the tool as claimed in claim 1.

* * * * *